F. A. NEIDER.
NAIL.
APPLICATION FILED MAY 12, 1909.

959,876.  Patented May 31, 1910.

WITNESSES:

INVENTOR.
Fred A. Neider
BY
ATTORNEY.

UNITED STATES PATENT OFFICE.

FRED A. NEIDER, OF AUGUSTA, KENTUCKY.

NAIL.

959,876.  Specification of Letters Patent.  Patented May 31, 1910.

Application filed May 12, 1909. Serial No. 495,487

To all whom it may concern:

Be it known that I, FRED A. NEIDER, a citizen of the United States of America, and resident of Augusta, county of Bracken, State of Kentucky, have invented certain new and useful Improvements in Nails, of which the following is a specification.

The object of my invention is to provide, in a shape which lends itself readily to manufacture, a nail, which while it may be driven to place firmly so as to secure the timbers which it is to join, snugly together, may be removed readily by means of a nail lifter.

In the accompanying drawings I have illustrated a nail embodying my invention, and have given views of it in the course of manufacture.

Figure 1:
Figure 2:
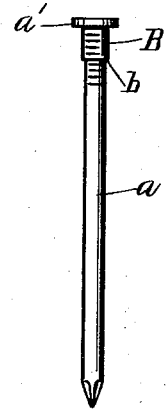
Figure 3:
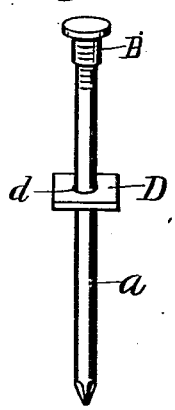
Figure 4:
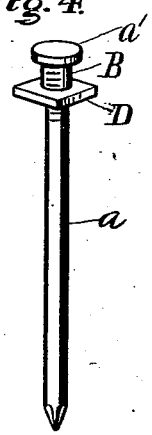

Referring to the drawings: Figure 1 is a side elevation of an ordinary wire nail. Fig. 2 is a similar view of the same with the shoulder upset thereon, adjacent to the head. Fig. 3 is a perspective view showing the washer in the process of being driven to place adjacent to the shoulder. Fig. 4 is a perspective view of the complete nail of my invention.

Starting with the ordinary wire nail, A, a shoulder, B, is formed thereon by upsetting the nail. This shoulder, B, is formed with an abrupt ridge, $b$, between it and the shank, $a$, of the nail. Washer, D, is larger in diameter than the head, $a'$, of the nail, is made of hard metal, such as tempered steel, and has a central perforation, $d$, which is of a diameter slightly less than the diameter of the shank, $a$, so that the washer, D, has a "driving fit" upon the shank, $a$. Washer, D, is driven onto the shank, $a$, so as to contact the shoulder, B.

When the nail embodying my invention is fully driven into a timber, washer, D, seats against the outer face of the timber. Heavy blows may be rained upon the head of the nail, without sinking the washer into the timber, and without causing the washer to be spread by the shoulder. Were the washer of the size of the head of the nail, it would be driven into the timber by blows such as are required to draw the timbers being joined securely together, for the reason that the head, $a'$, is more exposed to the full blow of the hammer than in an ordinary nail when it is driven to place, because in the latter case, the head becomes flush with the timber, which then contacts part of the head of the hammer. The washer, D, is not spread by the shoulder because the washer is of hard metal, has a "driving fit" upon the shank, $a$, and the meeting edge of the shoulder, B, is abrupt, thereby making a firm seat against which the washer abuts.

What I claim is:

The combination of a nail having near one end an enlargement capable of being formed by upsetting the metal, and a hard metal washer fitting the shank of the nail snugly and abutting against the shoulder, whereby the washer is adapted to withstand the force of blows necessary to draw timbers together by blows upon the nail.

FRED A. NEIDER.

Witnesses:
 LEO G. O'NEILL,
 EDWIN C. TOLEMAN.